(12) United States Patent
Motomura

(10) Patent No.: US 6,505,276 B1
(45) Date of Patent: Jan. 7, 2003

(54) PROCESSING-FUNCTION-PROVIDED PACKET-TYPE MEMORY SYSTEM AND METHOD FOR CONTROLLING THE SAME

(75) Inventor: Masato Motomura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/335,792

(22) Filed: Jun. 18, 1999

(30) Foreign Application Priority Data

Jun. 26, 1998  (JP) ............................................ 10-180335
Jun. 26, 1998  (JP) ............................................ 10-180337

(51) Int. Cl.$^7$ .......................... G06F 12/00; G06F 13/28
(52) U.S. Cl. ...................... 711/158; 711/151; 710/244; 710/112
(58) Field of Search ................................ 711/105, 154, 711/158, 150, 151; 710/104, 244, 241, 240, 200, 112; 365/237; 370/412

(56) References Cited

U.S. PATENT DOCUMENTS

| | | | |
|---|---|---|---|
| 5,233,603 A | * 8/1993 | Takeuchi et al. ............ | 370/412 |
| 5,434,983 A | * 7/1995 | Yaso et al. .................. | 710/110 |
| 5,804,987 A | * 9/1998 | Ogawa et al. ................ | 326/37 |
| 5,805,905 A | * 9/1998 | Biswas et al. .............. | 711/150 |
| 5,862,396 A | * 1/1999 | Motomura .................... | 710/74 |
| 5,892,958 A | * 4/1999 | Nakashige et al. ......... | 365/227 |
| 6,026,461 A | * 2/2000 | Baxter et al. ............... | 710/244 |
| 6,108,731 A | * 8/2000 | Suzuki et al. ............... | 710/104 |
| 6,247,084 B1 | * 6/2001 | Apostol et al. ............. | 711/150 |
| 6,338,108 B1 | * 1/2002 | Motomura ................... | 711/105 |
| 6,339,341 B1 | * 1/2002 | Fujii et al. .................... | 326/38 |

FOREIGN PATENT DOCUMENTS

| | | |
|---|---|---|
| EP | 0 338 558 A2 | * 10/1989 |
| JP | 53-112625 | 10/1978 |
| JP | 61-60162 | 3/1986 |
| JP | 61-91757 | 5/1986 |
| JP | 63-75958 | 4/1988 |
| JP | 63-88666 | 4/1988 |
| JP | 63-106035 | 5/1988 |
| JP | 64-38860 | 2/1989 |
| JP | 10-143489 | 5/1989 |
| JP | 2-45857 | 2/1990 |
| JP | 2-120961 | 5/1990 |
| JP | 3-278261 | 12/1991 |
| JP | 4-654 | 1/1992 |
| JP | 5-507374 | 10/1993 |
| JP | 6-215160 | 8/1994 |
| JP | 8-235106 | 9/1996 |
| JP | 08278939 A | * 10/1996 |
| JP | 9-97587 | 4/1997 |
| JP | 10-49428 | 2/1998 |

OTHER PUBLICATIONS

"L64381 4–Port Ethernet Controller Device Technical Manual," LSI Logic, Inc., pp. 1–1 to 7–16, Aug. 1996.*

(List continued on next page.)

*Primary Examiner*—Matthew Kim
*Assistant Examiner*—Pierre-Michel Bataille
(74) *Attorney, Agent, or Firm*—Whitham, Curtis & Christofferson, PC

(57) ABSTRACT

To provide a processing-function-provided packet-type memory system making it possible to perform more flexible processing when a processing-function-provided packet-type memory LSI in the system makes it possible to issue a command through a command bus and a method for controlling the system.

A packet-type memory bus of a processing-function-provided packet-type memory system is provided with a ready signal line 17 and a bus adjustment signal line 18 to notify completion of processing through the ready signal line 17 and adjust whether a memory controller LSI 11 or processing-function-provided packet-type memory LSI 3 occupies a command bus 15 through the bus adjustment signal line 18.

15 Claims, 7 Drawing Sheets

OTHER PUBLICATIONS

"LSI Logic Delivers Highly Integrated 4–Port Ethernet Controller for Switched and Multi–Port Hub Applications," Press Release, LSI Logic, Inc., http://www.lsilogic.com/mediakit/unit3_li.html, pp.1–2, Feb. 1995.*

T. Ogura et al., "A 4–kbit Associative Memory LSI", IEEE Journal of Solid–State Circuits, vol. SC–20, No. 6, pp. 1277–1282 (Dec. 1985).*

Arai, Y. et al., "A CMOS Four Channel x1K Time Memory LSI with 1–ns/b Resolution", IEEE Journal of Solid–State Circuits, vol. 27, No. 3,M, 8107 Mar., 1992, No.3, New York, US.*

Balaji et al., "Modeling ASIC Memories in VHDL", LSI Logic Corporation, IEEE Transactions, 1996.*

Japanese Office Action, dated Oct. 24, 2000, with English language translation of Japanese Examiner's comments. (10–180337).

Japanese Office Action, dated Oct. 24, 2000, with English language translation of Japanese Examiner's comments. (10–180335).

Y. Yabe et al., "Compression/Decompression DRAM for Unified Memory System," *Technical Report of IEICE,* vol. 98, No. 67, pp. 13–18, May 21, 1998.

"Direct Rambus Technology: The New Main Memory Standard" (pp. 18–28).

"SLDRAM: High–Performance, Open–Standard Memory" (pp. 29–39).

* cited by examiner

PROCESSING-FUNCTION-PROVIDED PACKET-TYPE MEMORY SYSTEM AND METHOD FOR CONTROLLING THE SAME

BACKGROUND OF THE INVENTION

1. Field of the Invention

The present invention relates to a packet-type memory Large Scale Integration circuit (LSI) having a packet-type memory bus and interface to be preferably used for a large-capacity memory LSI, particularly to a memory system of a processing-function-provided packet-type memory LSI configured for adding a processing function to a packet-type memory LSI and a method for controlling the memory system.

2. Description of the Prior Art

Japanese Patent Laid-Open No. 10-049428 specification (Japanese Patent Application No. 08-204668) discloses an art for constituting a processing-function-provided memory system by using a memory LSI and a processing-function-provided memory LSI.

Moreover, relating to the above art, Japanese Patent Application No. 09-097587 which was applied prior to this application but which was not released when this application was applied discloses an art for configuring a similar processing-function-provided memory system by particularly using a packet-type memory LSI and a processing-function-provided packet-type memory LSI.

In this case, a packet-type memory LSI represents a memory LSI for performing memory access by using a packet such as a Direct Rambus DRAM (Direct Rambus Dynamic Random Access Memory) (referred to as DRDRAM) or a Synchronous-Link DRAM (Synchronous-Link Dynamic Random Access Memory) (referred to as SLDRAM) and it is described in detail in "Direct Rambus Technology: The New Main Memory Standard" on pp. 18–28 and "SLDRAM: High-Performance, Open-Standard Memory" on pp. 29–39 in November/December 1997 issue of Journal for "IEEE Micro."

Moreover, a coprocessor-contained packet-type memory LSI represents a packet-type memory LSI configured by containing a coprocessor in an LSI. As for this specification, LSIs including those having a processing function other than a coprocessor are referred to as "processing-function-provided packet-type memory LSI."

In general, a memory system is configured by arranging a plurality of memory LSIs but it has only a function for storing the data used for processing. However, the processing-function-provided memory system disclosed in the official gazette of Japanese Patent Laid-Open No. 10-049428 specification is configured by using a memory LSI and a processing-function-provided memory LSI, which makes it possible to perform processing by a processing-function-provided memory LSI in the processing-function-provided memory system.

Moreover, the processing-function-provided packet-type memory system disclosed in the above Japanese Patent Application No. 09-097587 is configured by using a packet-type memory LSI and a processing-function-provided packet-type memory LSI, which controls execution of processing by the processing-function-provided packet-type memory LSI by using a packet instead of using the above mechanism of making memory access to a packet-type memory LSI by using a packet.

Moreover, Japanese Patent Laid-Open No. 61-91757 specification discloses a data transfer controller. The data transfer controller is configured of two controllers connected to each other by a bi-directional data bus, a plurality of control lines and an input/output unit connected to the bi-directional data bus which transfers data to and from only one of the two controllers. During data transfer for each unit-length data is performed through the bi-directional data bus while asynchronously confirming an other-controller's response signal to one-controller's request signal through the control line between the two controllers, one controller can transfer data to and from the input/output unit through the bi-directional data bus when the other controller switches transfer modes for the bi-directional data bus. Moreover, a monitoring signal line for inverting the logical state of a monitoring signal by responding start or end of data transfer between the two controllers is used as the control line and at least the other of the two controllers has decision means for deciding the validity of the logical state of the monitoring signal.

Furthermore, the official gazette of Japanese Patent Laid-Open No. 63-88666 specification discloses a bus adjustment controller. The bus adjustment controller is provided with a microprocessor not containing a bus-using-right adjustment function and a direct memory access controller for obtaining or resigning the bus-using right through the handshake system between a bus-using request signal and a bus-using permission signal to adjust the competition for bus-using produced between the microprocessor and the direct memory access controller.

Furthermore, Japanese Patent Laid-Open No. 63-106035 specification discloses a semiconductor file memory apparatus. The semiconductor file memory comprises an auxiliary memory using a semiconductor memory connected to a computer system to store and write/read or read data wherein the semiconductor file memory is a large-capacity semiconductor file memory configured from a Small Computer Systems Interface (SCSI) protocol control circuit, a microprocessor, a Direct Memory Access (DMA) control circuit, a bus drive, and a semiconductor memory provided with an address decoding circuit so that data can be transferred at a high speed when connected to the SCSI bus.

Furthermore, Japanese Patent Laid-Open No. 2-120961 specification discloses an invention related to an inter-memory data transfer system. The system comprises an information processor configured of at least a processor, a memory, and a DMA controller are connected by a local bus to a plurality of arithmetic units, are connected by a mutual connection line wherein the DMA controller in each arithmetic unit has at least a function for obtaining the bus-using right from the processor in the arithmetic unit, a function for resigning the bus-using right, a function for reading or writing data in a memory through the bus, a function for providing an instruction for the DMA controllers connected to other arithmetic units, a function for receiving instructions from the DMA controllers of the arithmetic units, a function for executing instructions supplied from DMA controllers of the arithmetic units, and a function for reading or writing data from or in memories of these arithmetic units and moreover, these functions can be separately and independently operated. Moreover, the DMA controller of a first arithmetic unit makes it possible to mutually perform data read and write operations between the memory of the first arithmetic unit and the memory of a second arithmetic unit via the mutual connection line with the processor of the first arithmetic unit and the processor of the second arithmetic unit separated from each bus.

Furthermore, Japanese Patent Laid-Open No. 8-235106 specification discloses an interfacing method and a system for an upgrade processor. This provides a method and a system for interfacing an upgrade processor and a data processing system having data bus widths different from each other. Specifically, the data processing system has a first processor having an m-byte data width, an n-byte data bus (m≧n), and a second processor connected to the bus to execute bus transaction by using an n-byte data packet. An adapter electrically connected between the first processor and the bus converts an n-byte data packet input from the bus into an m-byte data packet and an m-byte data packet input from the first processor into an n-byte data packet. Thereby, the first processor can transfer data to and from the bus by using the m-byte data packet. The second mode is a method and a system for adjusting the portion between two buses and masters having bus-obtaining protocols different from each other.

As for the memory system disclosed in the above prior application, a processing-function-provided memory system, particularly a processing-function-provided packet-type memory system is constituted by directly using a conventional memory bus, particularly, the conventional configuration of a packet-type memory bus. This is due to the following reason.

In general, as for a memory bus, because a bus master allowed to issue a command onto a bus is only a memory controller LSI, adjustment of the exclusive right of a memory bus is unnecessary. Moreover, because communication performed on a memory bus is only memory access such as read or write, the number of communication formats is small and the communication protocol is relatively simple.

Thus, because the protocol is simple, a processing-function-provided memory system using a conventional memory bus has a feature of capable of executing mutual communication through the memory bus in a short time.

Because a processing-function-provided memory system is a system including the function of a conventional system, how to decrease a delay time under memory access is a large problem together with improvement of a data band width.

Therefore, it can be said that the above feature is very suitable for the bus of a processing-function-provided memory system.

However, the fact that only a memory controller LSI can serve as a bus master means that a processing-function-provided memory LSI cannot serve as a bus master by performing the interrupt operation from the processing-function-provided memory LSI to a memory controller LSI.

Moreover, To make a processing-function-provided memory LSI perform complex processing, it is necessary to realize the above interrupt operation and make it possible for the processing-function-provided memory LSI to serve as a bus master.

Moreover, a bus-connection-type parallel processing system in which a plurality of processors is connected to one processor bus to perform parallel operation is present as a system using a plurality of bus masters. The communication protocol of the processor bus of the bus-connection-type parallel processing system is very complex compared to the communication protocol of a memory bus. This is due to several reasons.

The first reason is that a processor bus assumes that a plurality of bus masters is present. Therefore, these bus masters may simultaneously issue requests to the processor bus and thereby, it is necessary to control the exclusive right of the processor bus for determining which bus master can issue a request.

Moreover, to avoid dead lock or live lock, it is necessary to control a flow on a processor bus.

Furthermore, to improve the efficiency of parallel processing or distributed processing, it is necessary to support communication formats on many types of buses or communication patterns on many types of buses.

Furthermore, it may be necessary to incorporate a mechanism for assuring the consistency of the data between a plurality of processors such as cache coherency into protocols.

Thus, because communication protocols are complex, these systems have a problem that mutual communication through a processor bus requires a lot of time although a plurality of bus masters can be permitted.

BRIEF SUMMARY OF THE INVENTION

Object of the Invention

Therefore, the present invention is made in accordance with the recognition of the above technical problems and its main object is to provide a more-flexible and higher-performance processing-function-provided memory system and the control means for the same, making it possible for a processing-function-provided packet-type memory LSI to serve as a bus master while basically using the processing-function-provided packet-type memory LSI and a processing-function-provided packet-type memory system.

It is another object of the present invention to realize a processing-function-provided packet-type memory LSI provided with an external input/output terminal constituted by adding several signal lines to a packet-type memory through the above new packet-type memory bus art and provide a processing-function-provided memory system and the control means of the same, making it possible to use the processing-function-provided packet-type memory LSI and a conventional packet-type memory LSI by connecting them to the same packet-type memory bus.

It is still another object of the present invention to provide a processing-function-provided memory system and control means of the same for realizing memory access to the packet-type memory LSI and processing-function-provided packet-type memory LSI connected to the above packet-type memory bus without temporal overhead due to addition of a processing function.

SUMMARY OF THE INVENTION

A processing-function-provided packet-type memory system of the present invention for attaining the above objects is a processing-function-provided packet-type memory system configured of a plurality of packet-type memory LSIs, one processing-function-provided packet-type memory LSI, and one memory controller LSI, in which the memory controller LSI, packet-type memory LSI, and processing-function-provided packet-type memory LSI are connected by bi-directional data bus and command bus and moreover, the memory controller LSI and the processing-function-provided packet-type memory LSI are connected by a uni-directional ready signal line extending toward the memory controller LSI and a bus adjustment signal line serving as a bi-directional signal line.

Moreover, it is possible to provide a processing-function-provided packet-type memory system of the present invention as a processing-function-provided packet-type memory system configured of a plurality of packet-type memory LSIs, one processing-function-provided packet-type memory LSI, and one memory controller LSI, with the memory controller LSI, packet-type memory LSI, and processing-function-provided packet-type memory LSI connected by bi-directional data bus and command bus wherein the memory controller LSI and processing-function-provided packet-type memory LSI are connected by a unidirectional ready signal line extending toward the memory controller LSI and a processing-function-provided packet-type memory interrupt signal line serving as a unidirectional signal line extending from the memory controller LSI.

A method of the present invention for controlling a processing-function-provided packet-type memory system requests transfer of the exclusive right of a command bus from a memory controller LSI to a processing-function-provided packet-type memory LSI or from the processing-function-provided packet-type memory LSI to the memory controller LSI through a bus adjustment signal line.

A method of the present invention for controlling a processing-function-provided packet-type memory system requests transfer of the exclusive right of a command bus from a memory controller LSI to a processing-function-provided packet-type memory LSI through a memory controller interrupt signal line and moreover requests transfer of the exclusive right of the command bus from the processing-function-provided packet-type memory LSI to the memory controller LSI through a processing-function-provided packet-type memory interrupt signal line.

A method of the present invention for controlling a processing-function-provided packet-type memory system transfers the exclusive right of a command bus to a processing-function-provided packet-type memory LSI by transmitting an exclusive-right transfer command packet from a memory controller LSI to the processing-function-provided packet-type memory LSI through the command bus when the memory controller LSI has the exclusive right of the command bus and the processing-function-provided packet-type memory LSI requests transfer of the exclusive right of the command bus.

Moreover, a method of the present invention for controlling a processing-function-provided packet-type memory system transfers the exclusive right of a command bus to a memory controller LSI by transmitting an exclusive transfer command packet from a processing-function-provided packet type memory LSI to the memory controller LSI through the command bus when a processing-function-provided packet-type memory LSI has the exclusive right of the command bus and the memory controller LSI requests transfer of the exclusive right of the command bus.

Furthermore, as for a processing-function-provided packet-type memory system of the present invention, a packet-type memory LSI has an intrinsic device ID, a processing-function-provided packet-type memory LSI has an intrinsic device ID, and a memory controller LSI has an intrinsic device ID.

Furthermore, a method of the present invention for controlling a processing-function-provided packet-type memory system designates a memory controller LSI by using a device ID intrinsic to the memory controller LSI and transmits a command packet to the memory controller LSI when a processing-function-provided packet-type memory LSI obtains the exclusive right of a command bus.

Furthermore, a method of the present invention for controlling a processing-function-provided packet-type memory system notify a memory controller LSI whether a processing-function-provided packet-type memory LSI completes processing or the processing-function-provided packet-type memory LSI is ready to transfer an exclusive right to a memory controller LSI from the processing-function-provided packet-type memory LSI through a ready signal line.

DETAILED DESCRIPTION OF THE PREFERRED EMBODIMENTS

Embodiments of the present invention will be described below. A preferred embodiment of the present invention includes a plurality of packet-type memory LSIs (12-1 to 12-3 in FIG. 1), a processing-function-provided packet-type memory LSI (13 in FIG. 1), and a memory controller LSI (11 in FIG. 1), in which the memory controller LSI, a plurality of packet-type memory LSIs, and processing-function-provided packet-type memory LSI are connected by a bi-directional data bus (14 in FIG. 1) and a command bus (15 in FIG. 1) and the memory controller LSI and the processing-function-provided packet-type memory LSI are connected by a ready signal line serving as a unidirectional signal line toward the memory controller LSI(17 in FIG. 1) and a bi-directional bus adjustment signal line (18 in FIG. 1) extending up to the memory controller LSI, and transfer of the exclusive right of a command bus is requested from the memory controller LSI to the processing-function-provided packet-type memory LSI or from the processing-function-provided packet-type memory LSI to the memory controller LSI through the bi-directional bus adjustment signal line (18 in FIG. 1).

When the memory controller LSI (11 in FIG. 1) has the exclusive right of the command bus (15 in FIG. 1) and the processing-function-provided packet-type memory LSI (13 in FIG. 1) requests the exclusive right of the command bus, an exclusive right-transfer command packet is transmitted from the memory controller LSI to the processing-function-provided packet-type memory LSI through the command bus and thereby, the exclusive right of the command bus is transferred to the process-function provided packet type memory LSI.

On the other hand, when the processing-function-provided packet-type memory LSI (13 in FIG. 1) has the exclusive right of the command bus (15 in FIG. 1) and the memory controller LSI (11 in FIG. 1) requests transfer of the exclusive right of the command bus, the exclusive right of the command bus is transferred to the memory controller LSI by transmitting an exclusive right transfer command packet to the memory controller LSI from the processing-function-provided packet-type memory LSI through the command bus. The first to third embodiments of the present invention will be described below in more detail.

EXAMPLES

Figure 1:
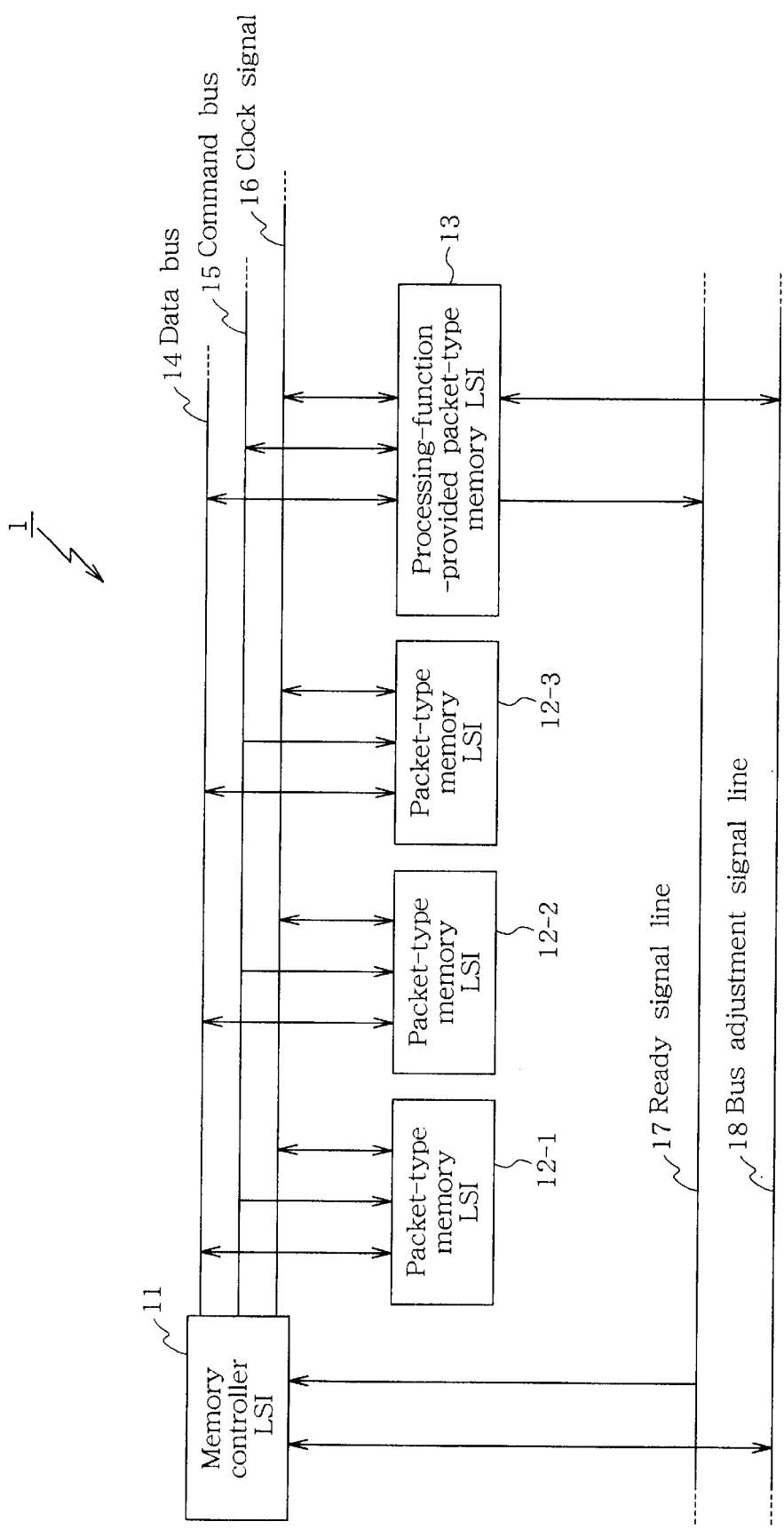
FIG. 1 is a block diagram showing the configuration of a first embodiment of the present invention.

FIG. 1 is a block diagram showing the configuration of the first embodiment of a processing-function-provided packet-type memory system of the present invention. In FIG. 1, a processing-function-provided packet-type memory system 1 is configured of a memory controller LSI 11, a plurality of packet-type memory LSIs 12-1 to 12-3, and a processing-function-provided packet-type memory LSI 13. The memory controller LSI 11, packet-type memory LSIs 12-1 to 12-3, and the memory controller LSI 11 and processing-function-provided packet-type memory LSI 13 are connected to one another by a bi-directional data bus 14, a bi-directional command bus 15, and a bi-directional clock signal line 16.

As for the packet-type memory system in the above Japanese Patent Application No. 09-09758 or the processing-function-provided packet-type memory system in the above Japanese Patent Application No. 08-204668, the command bus 15 uses a unidirectional bus extending from the memory controller LSI 11. As for the processing-function-provided packet-type memory system of this embodiment, however, the command bus 15 uses a bi-directional bus.

Moreover, the memory controller LSI 11 and the processing-function-provided packet-type memory LSI 13 are connected to each other by a unidirectional ready signal line 17 and a bi-directional bus adjustment signal line 18.

The ready signal line 17 is a signal line used for the processing-function-provided packet-type memory LSI 13 to notify completion of processing to the memory controller LSI 11.

Moreover, the bus adjustment signal line 18 is a signal line used to adjust whether it is the memory controller LSI 11 and the processing-function-provided packet-type memory LSI 13 which has the exclusive right of the command bus 15.

Figure 2:
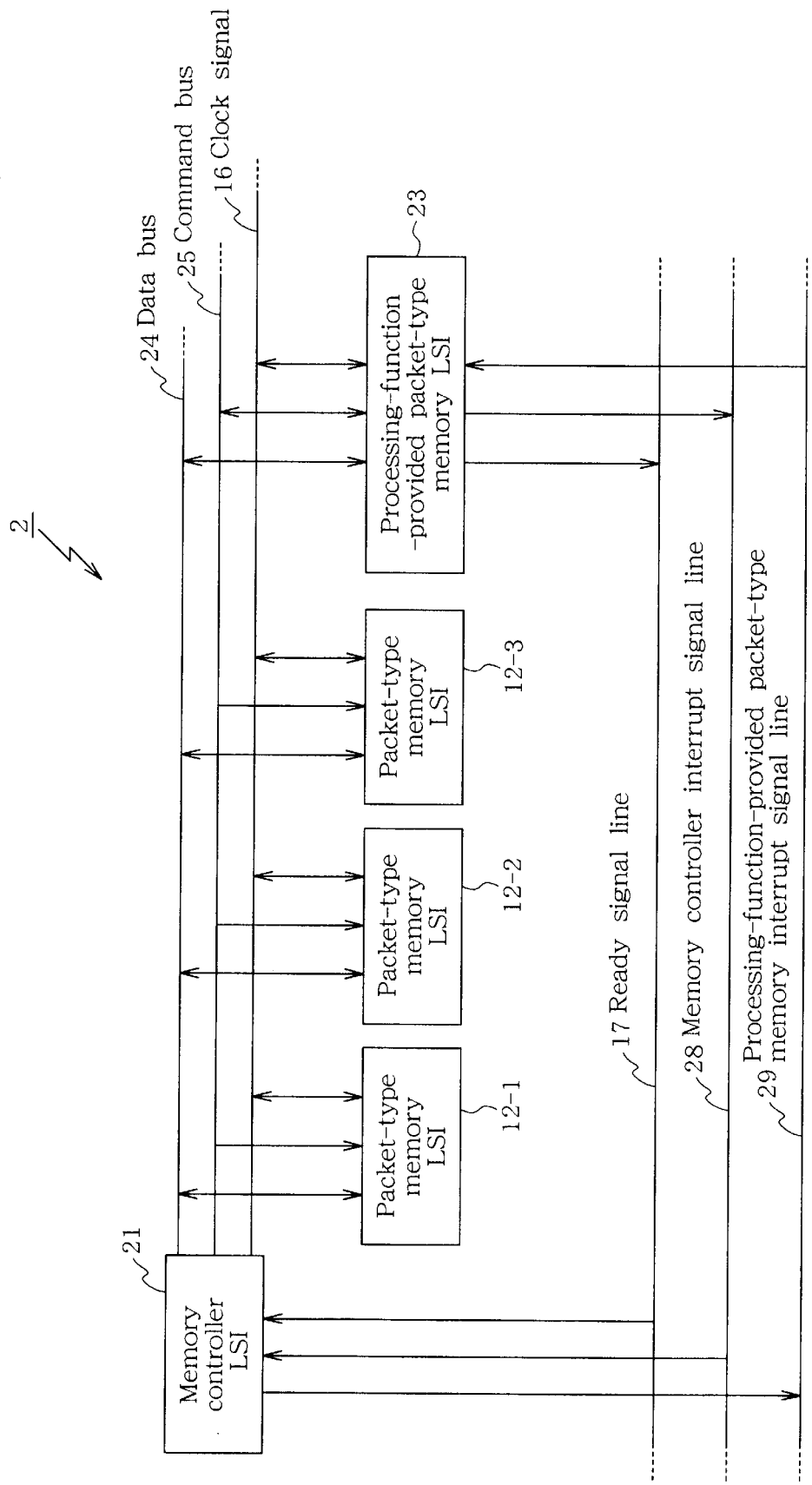
FIG. 2 is a block diagram showing the configuration of a second embodiment of the present invention.

FIG. 2 is a block diagram showing the configuration of the second embodiment configured of a processing-function-provided packet-type memory system of the present invention.

In FIG. 2, a processing-function-provided packet-type memory system 2 is configured of a memory controller LSI 21, a plurality of packet-type memory LSIs 12-1 to 12-3, and a processing-function-provided packet-type memory LSI 23.

Moreover, the memory controller LSI 21, packet-type memory LSIs 12-1 to 12-3, and the memory controller LSI 21 and processing-function-provided packet-type memory LSI 23 are connected to one another by a bi-directional data bus 14, a bi-directional command bus 15, and a bi-directional clock signal line 16.

Moreover, the memory controller LSI 21 and processing-function-provided packet-type memory LSI 23 are connected to each other by a unidirectional ready signal line 17, a memory controller interrupt signal line 28 toward the memory controller LSI 21 and by a unidirectional processing-function-provided packet-type memory interrupt signal line 29 extending from the memory controller LSI 21.

The ready signal line 17 is, for example, a signal line used for the processing-function-provided packet-type memory LSI 23 to notify completion of processing to the memory controller LSI 21 and so on. Moreover, the controller interrupt signal line 28 is a signal line used for the processing-function-provided packet-type memory LSI 23 to interrupt the memory controller LSI 21. However, the processing-function-provided packet-type memory interrupt signal line 29 is a signal line used for the memory controller LSI 21 to interrupt the processing-function-provided packet-type memory LSI 23.

As for the above-described packet-type memory LSI or processing-function-provided packet-type memory LSI of prior application, the command bus 15 uses a unidirectional bus extending from the memory controller LSI 1. As for the processing-function-provided packet-type memory system of this embodiment, however, the command bus 15 uses a bi-directional bus.

Then, operations of the processing-function-provided packet-type memory systems of the present invention shown in FIGS. 1 and 2 are described below.

Descriptions for memory access to the packet-type memory LSI 12 or processing-function-provided packet-type memory LSI 13 (23) from the memory controller LSI 11 (21, a symbol in parentheses denotes a reference symbol) using the data bus 14 and command bus 15, and descriptions for processing request access to the processing-function-provided packet-type memory LSI 13 (23) using the data bus 14 and command bus 15 are omitted because these accesses are described in Japanese Patent Application No. 09-097587.

As for these processing-function-provided packet-type memory systems, the memory controller LSI 11 (21) usually has the exclusive right of a command bus (that is, serves as a bus master) and is able to freely issue a command packet to the command bus 15.

The processing-function-provided packet-type memory LSI 13 (23) serves as a bus master in accordance with the following method and is able to issue a command packet to the command bus 15.

In FIG. 1, it is assumed that the bus adjustment signal line 18 is an active-low (active at low level) signal line. That is, the bus adjustment signal line 18 is set to be high level when neither memory controller LSI 11 nor processing-function-provided packet-type memory LSI 13 drive the bus adjustment signal line 18. Also, the line 18 is set to be low level when either of the memory controller LSI 11 or a processing-function-provided packet-type memory LSI 13 drives the bus adjustment signal line 18.

When the memory controller LSI 11 serves as a bus master and the processing-function-provided packet-type memory LSI 13 sets the bus adjustment signal line 18 to be low level, the memory controller LSI 11 decides that the processing-function-provided packet-type memory LSI 13 requests the exclusive right of the command bus 15.

The memory controller LSI 11 transfers the exclusive right of the command bus 15 to the processing-function-provided packet-type memory LSI 13 by transmitting an exclusive right transfer command packet to the processing-function-provided packet-type memory LSI 13 through the command bus 15.

However, when the processing-function-provided packet-type memory LSI 13 serves as a bus master, the memory controller 11 sets the adjustment signal line 18 to be low level, and the processing-function-provided packet-type memory LSI 13 decides that the memory controller LSI 11 requests the exclusive right of the command bus 15. The processing-function-provided packet-type memory LSI 13 transfers the exclusive right of the command bus 15 to the memory controller LSI 11 by transmitting an exclusive right transfer command packet to the memory controller LSI 11 through the command bus 15.

In FIG. 2, it is assumed that the memory controller interrupt signal line 28 and processing-function-provided packet-type memory interrupt signal line 29 are active-low signals. That is, while the memory controller LSI 21 does not drive the processing-function-provided packet-type memory interrupt signal line 29 or the processing-function-provided packet-type memory LSI 23 does not drive the memory controller interrupt signal line 28, each signal line is set to be high level. However, when the memory controller LSI 21 or processing-function-provided packet type memory LSI 23 drives each signal line, the signal line is set to be low level.

When the processing-function-provided packet-type memory LSI 23 sets the memory controller interrupt signal line 28 to be low level while the memory controller LSI 21 serves as a bus master, the memory controller LSI 21 decides that the processing-function-provided packet-type memory LSI 23 requests the exclusive right of the command bus 15. The memory controller LSI 21 transfers the exclusive right of the command bus 15 to the processing-function-provided packet-type memory LSI 23 by transmitting an exclusive right transfer command packet to the processing-function-provided packet-type memory LSI 23 through the command bus 15.

However, when the memory controller LSI 21 drives the processing-function-provided packet-type memory interrupt signal line 29 while the processing-function-provided packet-type memory LSI 23 serves as a bus master, the processing-function-provided packet-type memory LSI 23 decides that the memory controller LSI 21 requests the exclusive right of the command bus 15.

The processing-function-provided packet-type memory LSI 23 transfers the exclusive right of the command bus 15 to the memory controller LSI 21 by transmitting an exclusive right transfer command packet to the memory controller LSI 21 through the command bus 15.

Figure 3:
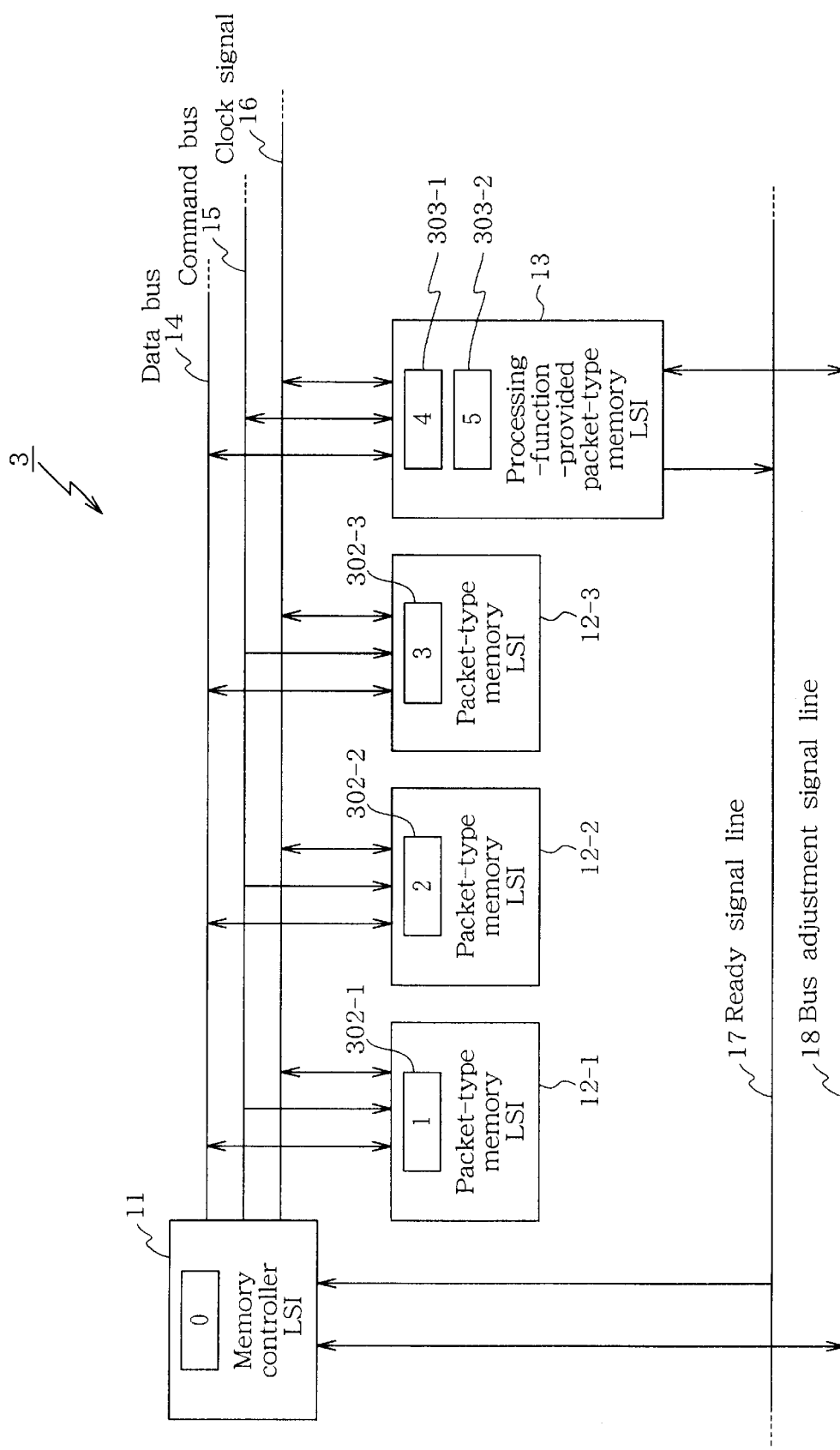
FIG. 3 is a block diagram showing the configuration of a third embodiment of the present invention.

FIG. 3 is a block diagram showing the configuration of the third embodiment constituted of a processing-function-provided packet-type memory system of the present invention. In FIG. 3, this embodiment is configured by extending the first embodiment described for FIG. 1. Similarly, the second embodiment shown in FIG. 2 can be extended to the configuration of this embodiment.

In FIG. 3, as for this embodiment, the packet-type memory LSIs 12-1 to 12-3 have intrinsic device IDs 302-1 to 302-3 and the processing-function-provided packet-type memory LSI 13 has two intrinsic device IDs 303-1 and 303-2.

In this case, the processing-function-provided packet-type memory LSI 13 has the device ID 303-1 for the memory section in the processing-function-provided packet-type memory LSI 13 and the device ID 303-2 for the processing section in the LSI 13 in order to transmit command packets different from each other to the memory section and the processing section separately as described in Japanese Patent Application No. 09-097587.

A device ID is used to identify the target of a command by setting the device ID of a device serving as the target of the command in a command packet. In FIG. 3, the value of the device ID 303-1 for the memory section in the processing-function-provided packet-type memory LSI 13 is set to be "4." Therefore, by assuming that the value of the device ID is "4" and thereby transmitting a command packet, the command recognizes the memory section in the processing-function-provided packet-type memory LSI 13 as a target.

In FIG. 3, the memory controller LSI 11 also has a device ID 301. Thus, by supplying the device ID 301 to the memory controller LSI 11, it is possible to transmit a command packet to any one of the memory controller LSI 11 and the packet-type memory LSIs 12-1 to 12-3 from the processing-function-provided packet-type memory LSI 13 when the processing-function-provided packet-type memory LSI 13 obtains the exclusive right of a command bus.

This is realized by setting a target device ID in a command packet.

Moreover, as described above, when it is necessary to transmit an exclusive right transfer command packet to the memory controller LSI 11 from the processing-function-provided packet-type memory LSI 13, it is possible to transmit the exclusive right transfer command packet to the memory controller LSI 11 from the processing-function-provided packet-type memory LSI 13 by setting the device ID 301 of the memory controller LSI 11 in the exclusive right transfer command packet.

As for each of the embodiments described by referring to FIGS. 1 to 3, ready signal line 17 is used to notify completion of processing by the processing-function-provided packet-type memory LSI 13. For example, when the memory controller LSI 11 (21) has the exclusive right of the command bus 15, the processing-function-provided packet-type memory LSI 13 (23) transmits a read signal to the memory controller LSI 11 (21) and thereby, it is possible to notify that the next processing request command can be accepted.

Moreover, when the processing-function-provided packet-type memory LSI 13 (23) has the exclusive right of the command bus 15, the processing-function-provided packet-type memory LSI 13 (23) transmits a ready signal to the memory controller LSI 11 (21) and thereby, it is possible to communicate that the processing-function-provided packet-type memory LSI 13 (23) is ready to accept an interrupt from the memory controller LSI 11 (21) and the exclusive right of the command bus 15 can be transferred to the memory controller LSI 11 (21).

Figure 4:
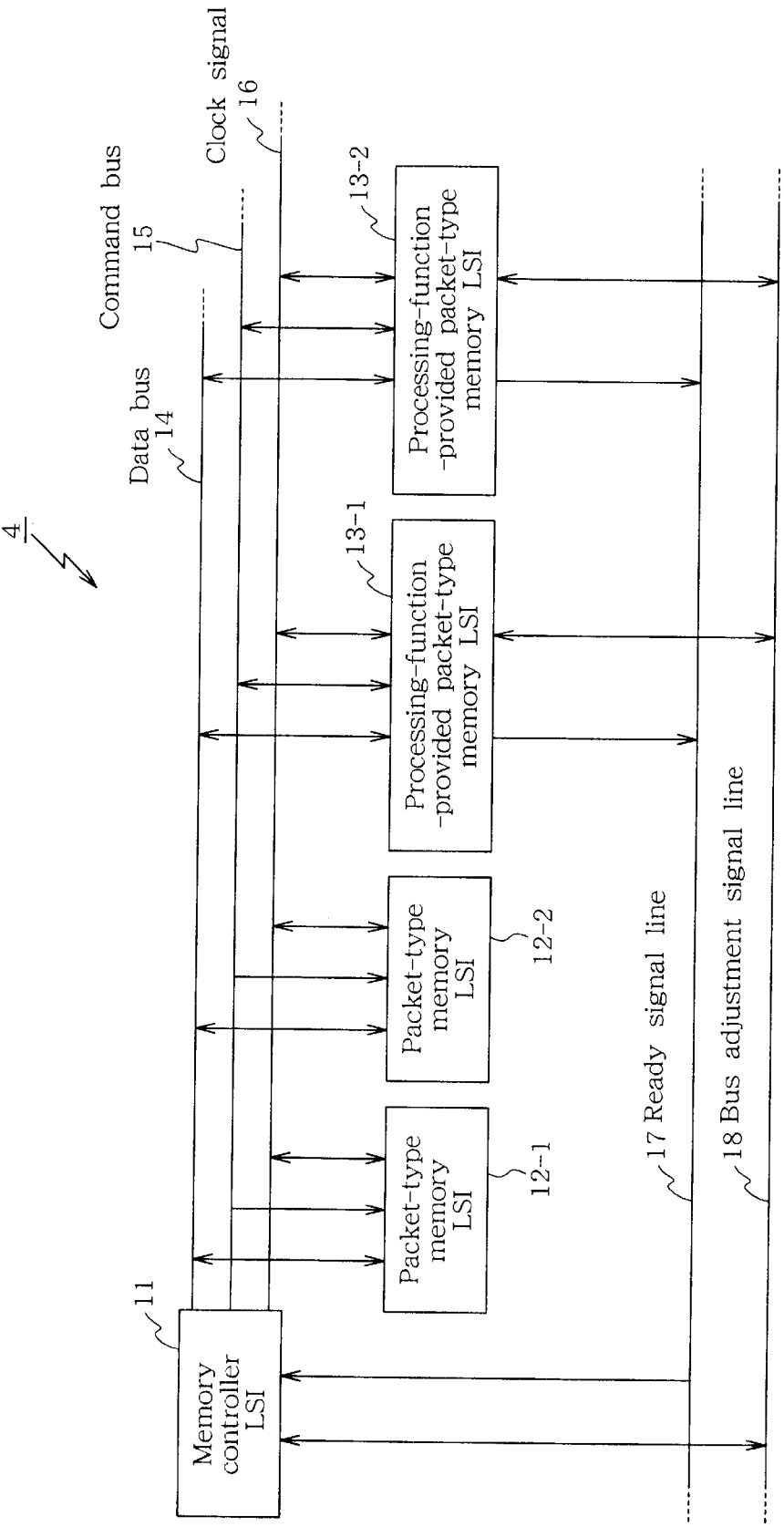
FIG. 4 is a block diagram showing the configuration of a fourth embodiment of the present invention.

FIG. 4 is a block diagram showing the configuration of the fourth embodiment of a processing-function-provided packet-type memory system of the present invention. In FIG. 4, the processing-function-provided packet-type memory system 4 is configured of a memory controller LSI 11, a plurality of packet-type memory LSIs 12-1 and 12-2, and a plurality of processing-function-provided packet-type memory LSIs 13-1 and 13-2. Moreover, the memory controller LSI 11, packet-type memory LSIs 12-1 and 12-2, and the memory controller LSI 11 and processing-function-provided packet-type memory LSIs 13-1 and 13-2 are connected to one another by a bi-directional data bus 14, a command bus 15 and a bi-directional clock signal line 16.

As for the conventional packet-type memory systems or processing-function-provided packet-type memory systems, the command bus 15 uses a unidirectional bus extending from the memory controller LSI 11. However, as for the processing-function-provided packet-type memory system of the fourth embodiment of the present invention, the command bus 15 uses a bi-directional bus.

Moreover, the memory controller LSI 11 and a plurality of processing-function-provided packet-type memory LSIs 13-1 and 13-2 are connected by a unidirectional ready signal line 17 and a bi-directional bus adjustment signal line 18 respectively extending up to the memory controller LSI 11.

The ready signal line 17 is a signal line used for the processing-function-provided packet-type memory LSIs 13-1 and 13-2 to notify completion of processing to the memory controller LSI 11. Moreover, the bus adjustment signal line 18 is a signal line used to adjust whether the memory controller LSI 11 or processing-function-provided packet-type memory LSI 13 has the exclusive right of the command bus 15.

Figure 5:
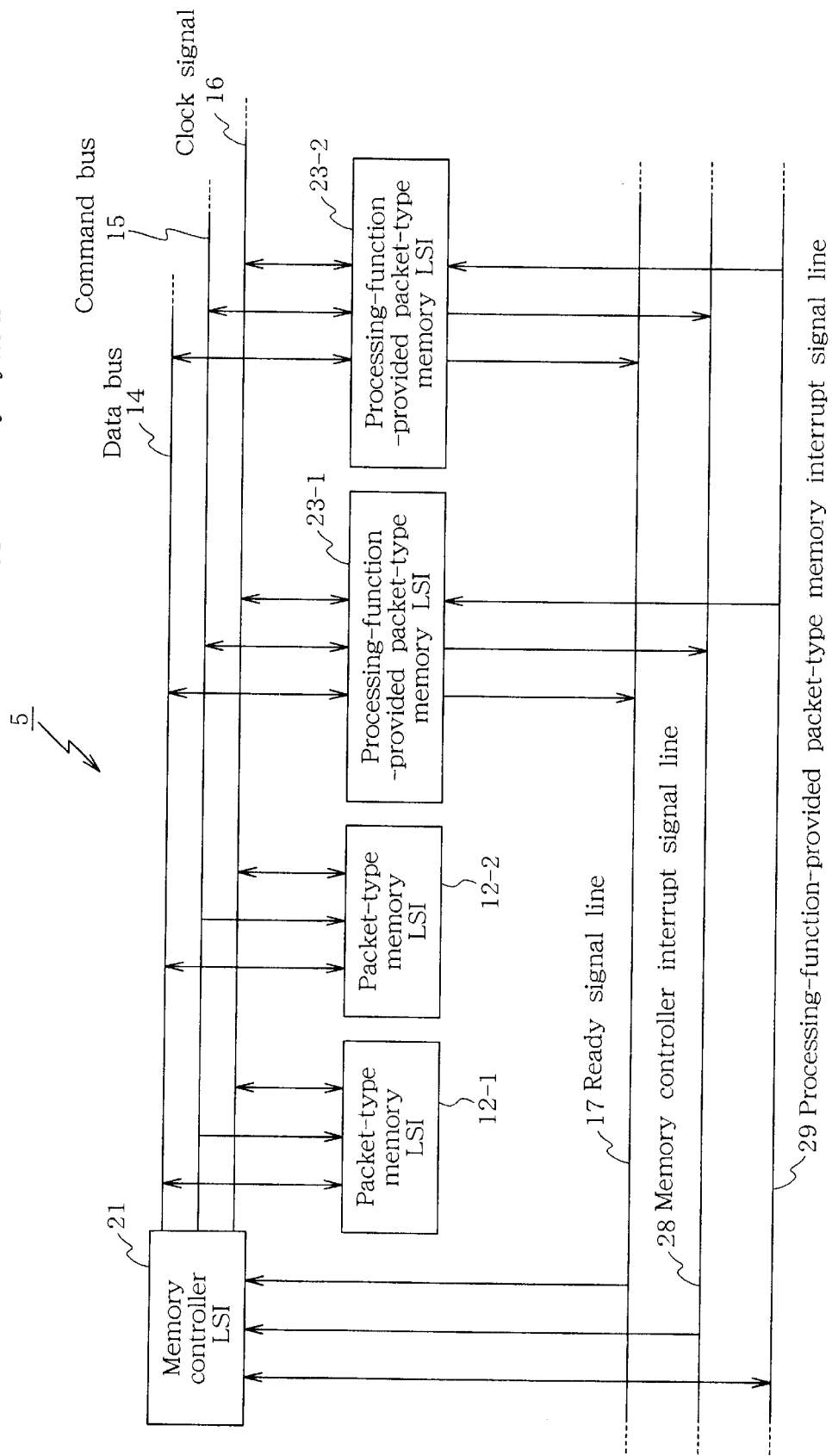
FIG. 5 is a block diagram showing the configuration of a fifth embodiment of the present invention.

FIG. 5 is a block diagram showing the fifth embodiment of a processing-function-provided packet-type memory system of the present invention. In FIG. 5, the processing-function-provided packet-type memory system 5 is configured of a memory controller LSI 21, a plurality of packet-type memory LSIs 12-1 and 12-2, and a plurality of processing-function-provided packet-type memory LSIs 23-1 and 23-2. Moreover, the memory controller LSI 21, the packet-type memory LSIs 12-1 and 12-2, and the memory controller LSI 21 and processing-function-provided packet-type memory LSIs 23-1 and 23-2 are connected to one another by a bi-directional data bus 14, a bi-directional command bus 15, and a bi-directional clock signal line 16.

Moreover, the memory controller LSI 21 and the processing-function-provided packet-type memory LSIs 23-1 and 23-2 are connected by a unidirectional ready signal line 17 and memory controller interrupt signal line 28 extending up to the memory controller LSI 21 and a unidirectional processing-function-provided packet-type memory interrupt signal line 29 extending from the memory controller LSI 21.

The ready signal line 17 is a signal line used for the processing-function-provided packet-type memory LSIs 23-1 and 23-2 to notify completion of processing to the memory controller LSI 21.

Moreover, the controller interrupt signal line 28 is a signal line used for the processing-function-provided packet-type memory LSIs 23-1 and 23-2 to interrupt the memory controller LSI 21.

However, the processing-function-provided packet-type memory interrupt signal line 29 is a signal line used for the memory controller LSI 21 to interrupt the processing-function-provided packet-type memory LSIs 23-1 and 23-2.

As for the packet-type memory LSI disclosed in Japanese Patent Application No. 09-097587 or the processing-function-provided packet-type memory LSI disclosed in Japanese Patent Application No. 08-204668, the command bus 15 uses a unidirectional bus extending from the memory controller LSI 11. However, as for the processing-function-provided packet-type memory system of the fourth embodiment of the present invention, the command bus 15 uses a bi-directional bus.

Then, operations of the processing-function-provided packet-type memory systems of the fourth and fifth embodiments of the present invention shown in FIGS. 4 and 5 are described below. Description for memory access to the packet-type memory LSI 12 or processing-function-provided packet-type memory LSI 13 (23) from the memory controller LSI 11 (21, a symbol in parentheses denotes a reference symbol) using the data bus 14 and command bus 15 and processing request access to the processing-function-provided packet-type memory LSI 13 (23) using the data bus 14 and command bus 15 are omitted because these accesses are described in Japanese Patent Application No. 09-097587.

As for the processing-function-provided packet-type memory systems described for the fourth and fifth embodiments, the memory controller LSI 11 (21) usually has the exclusive right of a command bus, that is, serves as a bus master and is able to freely issue a command packet to the command bus 15. The processing-function-provided packet-type memory LSI 13 (23) serves as a bus master in accordance with the following method so as to be able to issue a command packet to the command bus 15.

In FIG. 4, it is assumed that the bus adjustment signal line 18 is an active-low signal line. That is, while neither memory controller LSI 11 nor processing-function-provided packet-type memory LSI 13 drive the bus adjustment signal line 18, the bus adjustment signal line 18 is set to be high level but it is set to be low level when any one of the memory controller LSI 11 or the processing-function-provided packet-type memory LSIs 13-1 or 13-2 drives the bus adjustment signal line 18.

When either of the processing-function-provided packet-type memory LSIs 13-1 and 13-2 drives the bus adjustment signal line 18 to be low level while the memory controller LSI 11 serves as a bus master, the memory controller LSI 11 decides that either of the processing-function-provided packet-type memory LSIs 13-1 or 13-2 has the exclusive right of the command bus 15.

The memory controller LSI 11 transfers the exclusive right of the command bus 15 to the processing-function-provided packet-type memory LSI 13-1 or 13-2 by transmitting an exclusive right transfer command packet to the processing-function-provided packet-type memory LSIs 13-1 and 13-2 through the command bus 15.

However, when the memory controller LSI 11 drives the bus adjustment signal line 18 to be low level while either of the processing-function-provided packet-type memory LSIs 13-1 or 13-2 serves as a bus master, the processing-function-provided packet-type memory LSI 13-1 or 13-2 decides that the memory controller LSI 11 requests the exclusive right of the command bus 15.

A processing-function-provided packet-type memory LSI having the exclusive right of a command bus out of the processing-function-provided packet-type memory LSIs 13-1 and 13-2 transfers the exclusive right of the command bus 15 to the memory controller LSI 11 by transmitting an exclusive right transfer command packet to the memory controller LSI 11 through the command bus 15.

In FIG. 5, it is assumed that the memory controller interrupt signal line 28 and the processing-function-provided packet-type memory interrupt signal line 29 are active-low signal lines. That is, while the memory controller LSI 21 does not drive the processing-function-provided packet-type memory interrupt signal line 29 or neither processing-function-provided packet-type memory LSIs 23-1 nor 23-2 drive the memory controller interrupt signal line 28, each signal line is set to be high level but the signal lines 28 and 29 are set to be low level when the memory controller LSI 21 or the processing-function-provided packet-type memory LSIs 23-1 or 23-2 drive each signal line.

When either of the processing-function-provided packet-type memory LSIs 23-1 and 23-2 sets the memory controller interrupt signal line 28 to be low level, the memory controller LSI 21 decides that the processing-function-provided packet-type memory LSI 23-1 or 23-2 requests the exclusive right of the command bus 15. The memory controller LSI 21 transfers the exclusive right of the command bus 15 to the processing-function-provided packet-type memory LSI 23-1 or 23-2 requesting the exclusive right by transmitting an exclusive right transfer command packet to the processing-function-provided packet-type memory LSIs 23-1 and 23-2 through the command bus 15.

However, when the memory controller 21 sets the processing-function-provided packet-type memory interrupt signal line 29 to be low level while either of the processing-function-provided packet-type memory LSIs 23-1 or 23-2 serves as a bus master, an LSI serving as a bus master out of the processing-function-provided packet-type memory LSIs 23-1 and 23-2 decides that the memory controller LSI 21 requests the exclusive right of the command bus 15. The LSI serving as a bus master out of the processing-function-provided packet-type memory LSIs 23-1 and 23-2 transfers the exclusive right of the command bus 15 to the memory controller LSI 21 by transmitting an exclusive right transfer command packet to the memory controller LSI 21 through the command bus 15.

Figure 6:
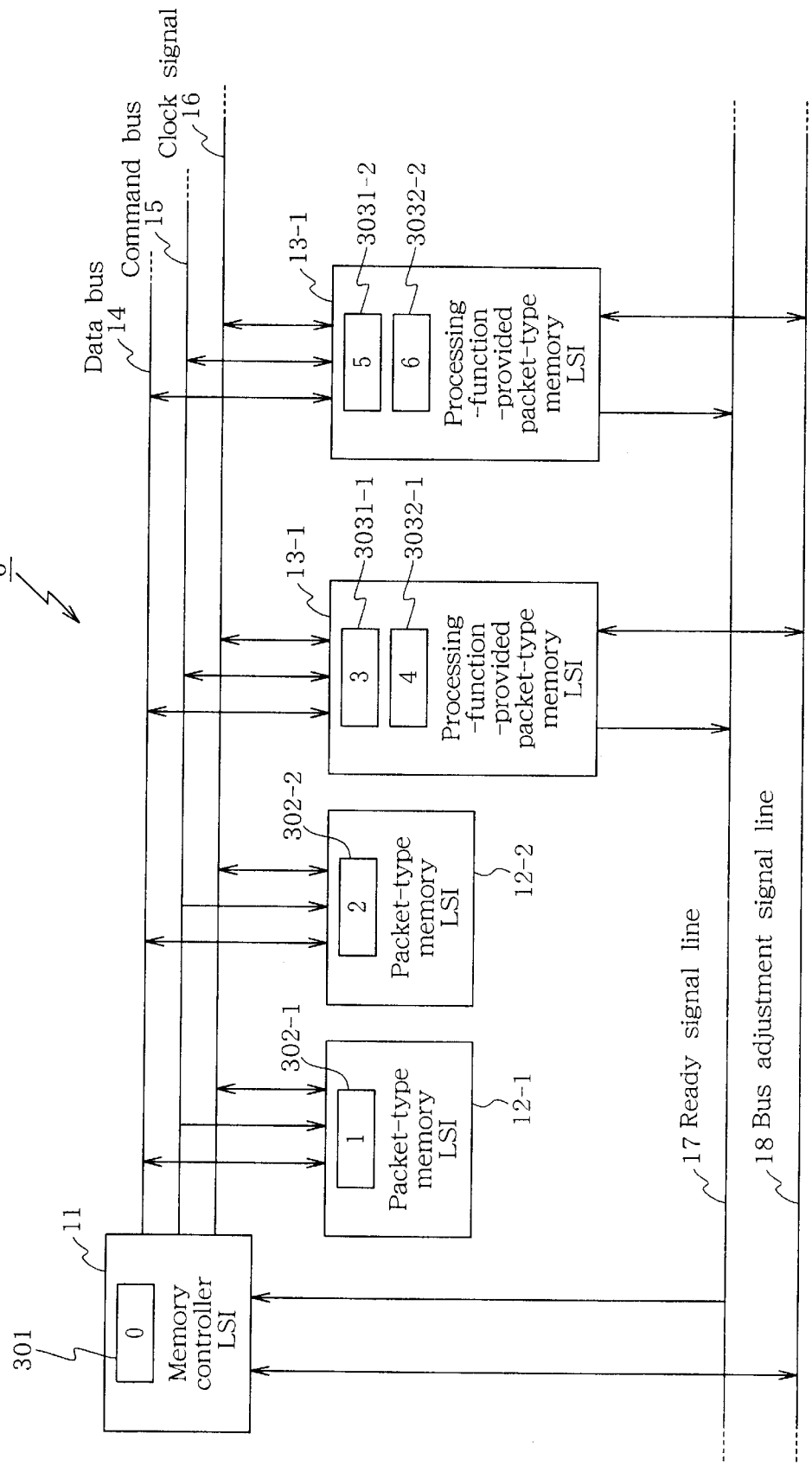
FIG. 6 is a block diagram showing the configuration of a sixth embodiment of the present invention.

FIG. 6 is a block diagram showing the sixth embodiment configured by a processing-function-provided packet-type memory system of the present invention. The sixth embodiment in FIG. 6 is configured by extending the fourth embodiment shown in FIG. 4. Similarly, it is possible to extend the fourth embodiment shown in FIG. 5. As for the sixth embodiment in FIG. 6, packet-type memory LSIs 12-1 and 12-2 have intrinsic device IDs 302-1 and 302-2 and each of processing-function-provided packet-type memory LSIs 13-1 and 13-2 have two intrinsic device IDs 3031-1 and 3032-1 and two intrinsic device IDs 3031-2 and 3032-2 respectively.

In this case, the processing-function-provided packet-type memory LSI 13-1 has the device IDs 3031-1 and 3032-1 and the processing-function-provided packet-type memory LSI 13-2 has the device IDs 3031-2 and 3032-2 in order to transmit command packets different from each other to the memory sections and the processing sections separately by using the device IDs 3031-1 and 3031-2 for the memory sections in the processing-function-provided packet-type memory LSIs 13-1 and 13-2 and the device IDs 3032-1 and 3032-2 for the processing sections in the LSIs 13-1 and 13-2 separately as described in the above Japanese Patent Application No. 09-097587. A device ID is used to identify a command target by setting the device ID of a device serving as a command target in a command packet. For example, by setting the value of a device ID to be "4" and thereby transmitting a command packet, the command uses the processing section in the processing-function-provided packet-type memory LSI 13-1 as a target. This is because the value of the device ID of the processing section in the processing-function-provided packet-type memory LSI 13-1 is set to be "4" in FIG. 6.

In FIG. 6, as for this embodiment, the memory controller LSI 11 also has a device ID 301. Thus, by providing the device ID 301 also for the memory controller LSI 11, it is possible to transmit a command packet to either of the controller memory LSI 11 or the packet-type memory LSI 12 from the processing-function-provided packet-type memory LSIs 13-1 or 13-2 when either of the processing-function-provided packet-type memory LSIs 13-1 or 13-2 obtains the exclusive right of a command bus. This is realized by setting a target device ID in a command packet.

Moreover, as described above, when it is necessary to transmit an exclusive right transfer command packet to the memory controller LSI 11 from the processing-function-provided packet-type memory LSI 13-1 or 13-2, it is possible to transmit the exclusive right transfer command packet to the memory controller LSI 11 from the processing-function-provided packet-type memory LSI 13 by setting the device ID 301 of the memory controller LSI 11 in the exclusive right transfer command packet.

As for the fourth to sixth embodiment of the present invention shown in FIGS. 4 to 6, the ready signal line 17 is used to notify completion of processing by the processing-function-provided packet-type memory LSI 13-1 or 13-2 (23-1 or 23-2, a symbol in parentheses denotes a reference symbol in FIG. 5). For example, when the memory controller LSI 11 (21) has the exclusive right of the command bus 15, the processing-function-provided packet-type memory LSI 13-1 or 13-2 (23-1 or 23-2) transmits a ready signal to the memory controller LSI 11 (21) and thereby, it is possible to communicate that the next processing request command can be accepted.

Moreover, when the processing-function-provided packet-type memory LSI 13-1 or 13-2 (23-1 or 23-2) has the exclusive right of the command bus 15, the processing-function-provided packet-type memory LSI 13-1 or 13-2 (23-1 or 23-2) transmits a ready signal to the memory controller LSI 11 (21) and thereby, it is possible to notify that the processing-function-provided packet-type memory LSI 13-1 or 13-2 (23-1 or 23-2) is ready to accept an interrupt from the memory controller LSI 11 (21) and the exclusive right of the command bus 15 can be transferred to the memory controller LSI 11 (21).

Furthermore, when the processing-function-provided packet-type memory LSI 13-1 or 13-2 (23-1 or 23-2) has the exclusive right of the command bus 15 and the memory controller LSI 11 (21) requests transfer of the exclusive right of the command bus 15, it is possible to use a control method for transferring the exclusive right of the command bus 15 by setting the ready signal line 17 to be low level and thereby transmitting a ready signal to the memory controller LSI 11 (21) instead of transmitting an exclusive right transfer command packet through the command bus 15 as described above.

That is, as for the control method, the memory controller LSI 11 (21) decides that the exclusive right of the command bus 15 is transferred in accordance with the fact that the ready signal line 17 is driven to be low level.

As for the processing-function-provided packet-type memory systems of the fourth and fifth embodiments of the present invention shown in FIGS. 4 and 5, the memory controller LSI 11 (21) and a plurality of processing-function-provided packet-type memories 13-1 and 13-2 (23-1 and 23-2) share one ready signal line 17 and one bus adjustment signal line 18 or one memory controller interrupt signal line 28 and one processing-function-provided packet-type memory interrupt signal line 29. Therefore, it is necessary to prevent these signal lines from being simultaneously driven by a plurality of devices. Moreover, when these signal lines are driven to be low level, it is necessary to identify which device drives the lines.

Moreover, an embodiment of a method of the present invention for controlling a processing-function-provided packet-type memory system uses one ready signal line 17 and one bus adjustment signal line 18 or one memory controller interrupt signal line 28 and one processing-function-provided packet-type memory interrupt signal line 29 through time-sharing. That is, bus cycles are cyclically labeled from 1 up to N (N is the total number of devices for driving these signal lines) to predetermine a label to be provided for each bus cycle at which each device drives these signal lines.

Thereby, a device for driving these signal lines is only one at any bus cycle. Thus, these signal lines are not simultaneously driven by a plurality of devices. Therefore, it is possible to identify decide a device driving these signal lines.

Figure 7:
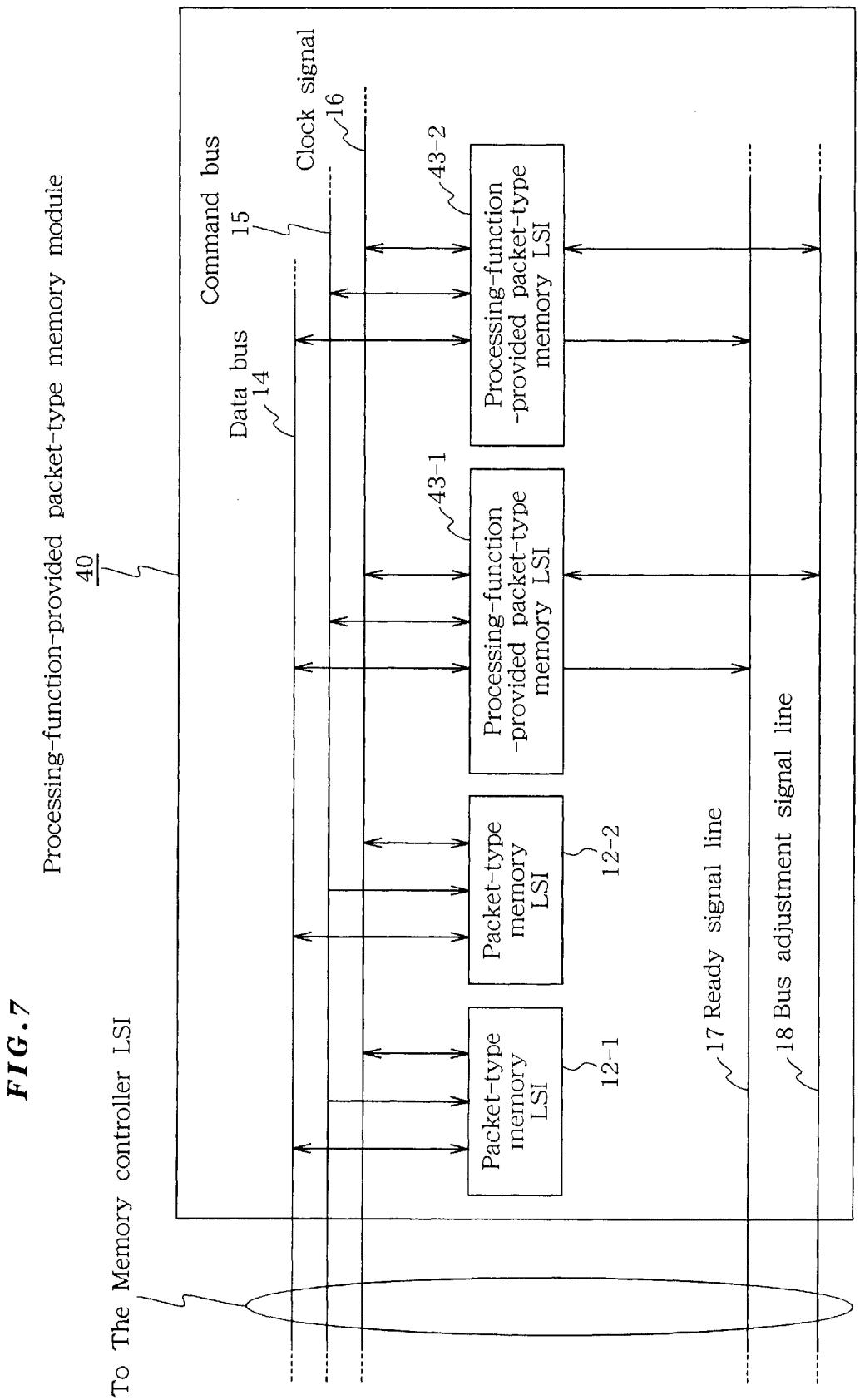
FIG. 7 is a block diagram showing the configuration of a seventh embodiment of the present invention.

FIG. 7 is an illustration showing the configuration of the seventh embodiment of a processing-function-provided packet-type memory system of the present invention, which is a block diagram showing the configuration of a processing-function-provided packet-type memory module.

In FIG. 7, as for the seventh embodiment of the present invention, the processing-function-provided packet-type memory system is configured by of a plurality of processing-function-provided packet-type memory modules 40. FIG. 7 shows the configuration of one of the processing-function-provided packet-type memory modules 40. In this case, a memory module corresponds to a DIMM (Dual Inlined Memory Module) or SIMM (Single Inlined Memory Module) which is commonly available.

As for the seventh embodiment in FIG. 7, a processing-function-provided packet-type memory LSI 43 can transmit a command packet into only the processing-function-provided packet-type memory module 40 of its own. This is because a case of transmitting a command packet into a memory module is superior to a case of transmitting it to a plurality of memory modules in electrical characteristic for signal transmission and it is possible to easily constitute a processing-function-provided packet-type memory system using the processing-function-provided packet-type memory LSI 43 as a bus master by limiting the transmission range of a command packet from the processing-function-provided packet-type memory LSI 43 to only one processing-function-provided packet-type memory module 40.

As for this embodiment, it is impossible to transmit a command packet from the processing-function-provided packet-type memory LSI 43 to the memory controller LSI 41 through the command bus 15 because the memory controller LSI 41 is present out of the memory modules 40. Therefore, the exclusive right of the command bus 15 is transferred by transmitting a ready signal through the ready signal line 17.

As described above, the present invention makes it possible for a processing-function-provided packet-type memory LSI to issue a command through a command bus. Thereby, the present invention has an advantage that very flexible processing can be executed compared to the case of the system disclosed in the prior application.

More specifically, according to the present invention, a processing-function-provided packet-type memory LSI in a processing-function-provided packet-type memory system issues a memory access command to a packet-type memory LSI in the same processing-function-provided packet-type memory system to make it possible to read or write data and processing or data can be requested by interrupting a memory controller LSI from a processing-function-provided packet-type memory LSI.

Moreover, according to the present invention, because a processing-function-provided packet-type memory LSI can issue a command through a command bus, it is possible to execute flexible processing compared to the case of a convention processing-function-provided packet-type memory system.

More specifically, according to the present invention, a processing-function-provided packet-type memory LSI in a processing-function-provided packet-type memory system issues a memory access command to a packet-type memory LSI in the same processing-function-provided packet-type memory system to make it possible to read or write data.

Moreover, the present invention makes it possible to cooperatively perform processing by interrupting a plurality of processing-function-provided packet-type memory LSIs each other.

Furthermore, the present invention makes it possible to request processing or data by interrupting a memory controller LSI from a processing-function-provided packet-type memory LSI.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-180335 (Filed on Jun. 26, 1998) and Japanese Patent Application No. 10-180337 (Filed on Jun. 26, 1998) including specification, claims, drawings and summary are incorporated herein by reference in its entirety.

What is claimed is:

1. A processing-function-provided packet-type memory system comprising:

a plurality of packet-type memory LSIs (Large Scale Integration circuits);

a plurality of processing-function-provided packet-type memory LSIs; and a memory controller LSI; wherein the memory controller LSI, the packet-type memory LSIs, and the processing-function-provided packet-type memory LSIs are connected to one another by a bi-directional data bus and a bi-directional command bus and moreover, the packet-type memory controller LSIs and the processing-function-provided packet-type memory LSIs are connected to each other by a unidirectional ready signal line extending toward the memory controller LSI and a bus adjustment signal line serving as a bi-directional signal line, wherein whether the processing-function-provided packet-type memory LSI completes processing or the fact that the processing-function-provided packet-type memory LSI is ready to transfer an exclusive right is notified from the processing-function-provided packet-type memory LSI to the memory controller LSI through the ready signal line.

2. A processing-function-provided packet-type memory system comprising:

a plurality of packet-type memory LSIs (Large Scale Integration circuits);

a plurality of processing-function-provided packet-type memory LSIs; and a memory controller LSI; wherein the memory controller LSI, the packet-type memory LSIs, and the processing-function-provided packet-type memory LSIs are connected to one another by a bi-directional data bus and a bi-directional command bus and moreover, the packet-type memory controller LSIs and the processing-function-provided packet-type memory LSIs are connected to each other by a unidirectional ready signal line extending toward the memory controller LSI and a bus adjustment signal line serving as a bi-directional signal line, wherein the processing-function-provided packet-type memory system is constituted of a plurality of memory modules, and the processing-function-provided packet-type memory LSI sets a range for transmitting a command through the command bus in a module to which the processing-function-provided packet-type memory LSI belongs.

3. A processing-function-provided packet-type memory system comprising:
   a plurality of packet-type memories;
   a plurality of processing-function-provided packet-type memories; and
   a memory controller; wherein
      the packet-type memories and the processing-function-provided packet-type memories are connected to the memory controller by a common bus,
      the processing-function-provided packet-type memories are provided with a ready signal line for notifying completion of processing to the memory controller and an exclusive request signal line for transferring a signal for requesting the exclusive right of the command bus between the memory controller and the processing-function-provided packet-type memories, and
      the bus master side having the exclusive right of the bus among the memory controller and the processing-function-provided packet-type memories notifies an exclusive right transfer to the side requesting transfer of the exclusive right of the bus through the bus when the bus master is the memory controller or through the bus or the ready signal line when the bus master is one of the processing-function-provided packet-type memories, wherein
         the memory controller, the packet-type memories, and the processing-function-provided packet-type memories are respectively provided with an intrinsic device ID (identification data), and also the memory controller serving as a bus master or one of the processing-function-provided packet-type memories serving as a bus master by obtaining the exclusive right of the bus, transmits a packet by designating a destination device ID to the packet to be transmitted through the bus.

4. A processing-function-provided packet-type memory system comprising:
   a plurality of packet-type memories;
   a plurality of processing-function-provided packet-type memories; and
   a memory controller; wherein
      the packet-type memories and the processing-function-provided packet-type memories are connected to the memory controller by a common bus,
      the processing-function-provided packet-type memories are provided with a ready signal line for notifying completion of processing to the memory controller and an exclusive request signal line for transferring a signal for requesting the exclusive right of the command bus between the memory controller and the processing-function-provided packet-type memories, and
      the bus master side having the exclusive right of the bus among the memory controller and the processing-function-provided packet-type memories notifies an exclusive right transfer to the side requesting transfer of the exclusive right of the bus through the bus when the bus master is the memory controller or through the bus or the ready signal line when the bus master is one of the processing-function-provided packet-type memories, wherein
         at least either of the ready signal line and the request signal line is driven by the memories and the memory controllers through time sharing, and
         an intrinsic bus cycle is assigned to a unit for driving the signal line by cyclically-numbering bus cycles up to an upper limit equal to the total number of units for driving signal lines used through the above time-sharing.

5. A processing-function-provided packet-type memory system comprising:
   a plurality of packet-type memories;
   a plurality of processing-function-provided packet-type memories; and
   a memory controller; wherein
      the packet-type memories and the processing-function-provided packet-type memories are connected to the memory controller by a common bus,
      the processing-function-provided packet-type memories are provided with a ready signal line for notifying completion of processing to the memory controller and an exclusive request signal line for transferring a signal for requesting the exclusive right of the command bus between the memory controller and the processing-function-provided packet-type memories, and
      the bus master side having the exclusive right of the bus among the memory controller and the processing-function-provided packet-type memories notifies an exclusive right transfer to the side requesting transfer of the exclusive right of the bus through the bus when the bus master is the memory controller or through the bus or the ready signal line when the bus master is one of the processing-function-provided packet-type memories, wherein
         at least either of the ready signal line and the request signal line is driven by the memories or the memory controllers through time-sharing, and
         an intrinsic bus cycle is assigned to a unit for driving the signal line by cyclically numbering bus cycles up to an upper limit equal to the total number of units for driving signal lines used through the above time-sharing.

6. A method for controlling a processing-function-provided packet-type memory system comprising:
   a plurality of packet-type memory LSIs (Large Scale Integration circuits);
   a processing-function-provided packet-type memory LSI; and
   a memory controller LSI; in which
      the memory controller LSI, a packet-type memory LSI of said plurality of packet-type memory LSIs, and the processing-function-provided packet-type memory LSI are connected to each other by a bi-directional data bus and a bi-directional command bus, and
      the memory controller LSI and the processing-function provided packet-type memory LSI are connected to each other by a unidirectional ready signal line extending toward the memory controller LSI and a bus adjustment signal line serving as a bi-directional signal line, comprising the step of:
         transferring the exclusive right of the command bus by requesting from the memory controller LSI to the processing-function-provided packet-type memory LSI or from the processing-function-provided packet-type memory LSI to the memory controller LSI through the bus adjustment signal line, wherein
            when the memory controller LSI has the exclusive right of the command bus and the processing-function-provided packet-type memory LSI requests transfer of the exclusive right of the command bus, an exclusive-right transfer command packet is transmitted from the memory controller LSI to the processing-function-provided packet-type memory LSI through the command bus and thereby, the exclusive right of the command bus is transferred to the processing-function-provided packet-type memory LSI.

7. A method for controlling a processing-function-provided packet-type memory system comprising:
   a plurality of packet-type memory LSIs (Large Scale Integration circuits);
   a processing-function-provided packet-type memory LSI; and
   a memory controller LSI; in which
      the memory controller LSI, a packet-type memory LSI of said plurality of packet-type memory LSIs, and the processing-function-provided packet-type memory LSI are connected to each other by a bi-directional data bus and a bi-directional command bus, and
      the memory controller LSI and the processing-function provided packet-type memory LSI are connected to each other by a unidirectional ready signal line extending toward the memory controller LSI and a bus adjustment signal line serving as a bi-directional signal line, comprising the step of:
         transferring the exclusive right of the command bus by requesting from the memory controller LSI to the processing-function-provided packet-type memory LSI or from the processing-function-provided packet-type memory LSI to the memory controller LSI through the bus adjustment signal line, wherein,
            when the processing-function-provided packet-type memory LSI has the exclusive right of the command bus and the memory controller LSI requests transfer of the exclusive right of the command bus, an exclusive-right command packet is transmitted from the processing-function-provided packet-type memory LSI to the memory controller LSI through the command bus and thereby, the exclusive right of the command bus is transferred to the memory controller LSI.

8. A method for controlling a processing-function-provided packet-type memory system comprising:
   a plurality of packet-type memory LSIs (Large Scale Integration circuits);
   a processing-function-provided packet-type memory LSI; and
   a memory controller LSI; in which
      the memory controller LSI, a packet-type memory LSI of said plurality of packet-type memory LSIs, and the processing-function-provided packet-type memory LSI are connected to each other by a bi-directional data bus and a bi-directional command bus, and
      the memory controller LSI and the processing-function provided packet-type memory LSI are connected to each other by a unidirectional ready signal line extending toward the memory controller LSI and a bus adjustment signal line serving as a bi-directional signal line, comprising the step of:
         transferring the exclusive right of the command bus by requesting from the memory controller LSI to the processing-function-provided packet-type memory LSI or from the processing-function-provided packet-type memory LSI to the memory controller LSI through the bus adjustment signal line, wherein
            when the packet-type memory LSI, the processing-function-provided packet-type memory LSI, and the memory controller LSI respectively have an intrinsic device ID (identification data) and the processing-function-provided packet-type memory LSI obtains the exclusive right of the command bus, the memory controller LSI obtains the exclusive right of the command bus, the memory controller LSI is designated by using the intrinsic device ID for the memory controller LSI.

9. A method for controlling a processing-function-provided packet-type memory system comprising:
   a plurality of packet-type memory LSIs (Large Scale Integration circuits);
   a processing-function-provided packet-type memory LSI; and
   a memory controller LSI; in which
      the memory controller LSI, a packet-type memory LSI of said plurality of packet-type memory LSIs, and the processing-function-provided packet-type memory LSI are connected to each other by a bi-directional data bus and a bi-directional command bus, and
      the memory controller LSI and the processing-function provided packet-type memory LSI are connected to each other by a unidirectional ready signal line extending toward the memory controller LSI and a bus adjustment signal line serving as a bi-directional signal line, comprising the step of:
         transferring the exclusive right of the command bus by requesting from the memory controller LSI to the processing-function-provided packet-type memory LSI or from the processing-function-provided packet-type memory LSI to the memory controller LSI through the bus adjustment signal line, wherein,
            whether the processing-function-provided packet-type memory LSI completes processing or the fact that the processing-function-provided packet-type memory LSI is ready to transfer an exclusive right is notified from the processing-function-provided packet-type memory LSI to the memory controller LSI through the ready signal line.

10. A method for controlling a processing-function-provided packet-type memory system comprising:
    a plurality of packet-type memory LSIs;
    a plurality of processing-function-provided packet-type memory LSIs; and
    a memory controller LSI; in which
       the memory controller LSI, the packet-type memory LSIs, and the processing-function-provided packet-type memory LSIs are connected to one another by a bi-directional data bus and a bi-directional command bus and moreover, the memory controller LSI and the processing-function-provided packet-type memory LSIs are connected to each other by a unidirectional ready signal line and a unidirectional memory controller interrupt LSI respectively extending toward the memory controller and a processing-functional-provided packet-type memory interrupt signal line serving as a unidirectional signal line extending from the memory controller LSI, wherein
any one of the processing-function-provided packet-type memory LSIs requests transfer of the exclusive right of the command bus from the memory controller LSI to the processing-function-provided packet-type memory LSI through the memory controller interrupt signal line, and
the memory controller LSI requests transfer of the exclusive right of the command bus from the processing-function-provided packet-type memory LSI to the memory controller LSI through the processing-function-provided packet-type memory interrupt signal line.

11. A method for controlling a processing-function-provided packet-type memory system comprising:
a plurality of packet-type memory LSIs (Large Scale Integration circuits);
a plurality of processing-function-provided packet-type memory LSIs; and
a memory controller LSI; in which
the memory controller LSI, the packet-type memory LSIs, and the processing-function-provided packet-type memory LSIs are connected to one another by a bi-directional data bus and a bi-directional command bus and moreover, the memory controller LSI and the processing-function-provided packet-type memory LSIs are connected to each other by a unidirectional ready signal line extending toward the memory controller LSI and a bus adjustment signal line serving as a bi-directional signal line, comprising the steps of:
transferring the exclusive right of the command bus by requesting to either the memory controller LSI or the processing-function-provided packet-type memory LSIs respectively having the exclusive right of the command bus at present between the memory controller LSI and the processing-function-provided packet-type memory controller LSIs through the bus adjustment signal line, wherein,
when the memory controller LSI has the exclusive right of the command bus and any one of the processing-function-provided packet-type memory controller LSIs requests transfer of the exclusive right of the command bus, an exclusive-right transfer command packet is transmitted from the memory controller LSI to the processing-function-provided packet-type memory LSI through the command bus and thereby, the exclusive right of the command bus is transferred to the processing-function-provided packet-type memory LSI.

12. A method for controlling a processing-function-provided packet-type memory system comprising:
a plurality of packet-type memory LSIs (Large Scale Integration circuits);
a plurality of processing-function-provided packet-type memory LSIs; and
a memory controller LSI; in which
the memory controller LSI, the packet-type memory LSIs, and the processing-function-provided packet-type memory LSIs are connected to one another by a bi-directional data bus and a bi-directional command bus and moreover, the memory controller LSI and the processing-function-provided packet-type memory LSIs are connected to each other by a unidirectional ready signal line extending toward the memory controller LSI and a bus adjustment signal line serving as a bi-directional signal line, comprising the steps of:
transferring the exclusive right of the command bus by requesting to either the memory controller LSI or the processing-function-provided packet-type memory LSIs respectively having the exclusive right of the command bus at present between the memory controller LSI and the processing-function-provided packet-type memory controller LSIs through the bus adjustment signal line, wherein,
when the processing-function-provided packet-type memory LSI has the exclusive right of the command bus and the memory controller LSI requests transfer of the exclusive right of the command bus, an exclusive-right transfer command packet is transmitted from the processing-function-provided packet-type memory LSI to the memory controller LSI through the command bus and thereby, the exclusive right of the command bus is transferred to the memory controller LSI.

13. A method for controlling a processing-function-provided packet-type memory system comprising:
a plurality of packet-type memory LSIs (Large Scale Integration circuits);
a plurality of processing-function-provided packet-type memory LSIs; and
a memory controller LSI; in which
the memory controller LSI, the packet-type memory LSIs, and the processing-function-provided packet-type memory LSIs are connected to one another by a bi-directional data bus and a bi-directional command bus and moreover, the memory controller LSI and the processing-function-provided packet-type memory LSIs are connected to each other by a unidirectional ready signal line extending toward the memory controller LSI and a bus adjustment signal line serving as a bi-directional signal line, comprising the steps of:
transferring the exclusive right of the command bus by requesting to either the memory controller LSI or the processing-function-provided packet-type memory LSIs respectively having the exclusive right of the command bus at present between the memory controller LSI and the processing-function-provided packet-type memory controller LSIs through the bus adjustment signal line, wherein,
when the processing-function-provided packet-type memory LSI has the exclusive right of the command bus and the memory controller LSI requests transfer of the exclusive right of the command bus, the exclusive right of the command bus is transferred from the processing-function-provided packet-type memory LSI to the memory controller LSI.

14. A method for controlling a processing-function-provided packet-type memory system comprising:
a plurality of packet-type memory LSIs (Large Scale Integration circuits);
a plurality of processing-function-provided packet-type memory LSIs; and a memory controller LSI; in which
  the memory controller LSI, the packet-type memory LSIs, and the processing-function-provided packet-type memory LSIs are connected to one another by a bi-directional data bus and a bi-directional command bus and moreover, the memory controller LSI and the processing-function-provided packet-type memory LSIs are connected to each other by a unidirectional ready signal line extending toward the memory controller LSI and a bus adjustment signal line serving as a bi-directional signal line, comprising the steps of:
    transferring the exclusive right of the command bus by requesting to either the memory controller LSI or the processing-function-provided packet-type memory LSIs respectively having the exclusive right of the command bus at present between the memory controller LSI and the processing-function-provided packet-type memory controller LSIs through the bus adjustment signal line, wherein
      the packet-type memory LSI, the processing-function-provided packet-type memory LSI, and the memory controller LSI respectively have an intrinsic device ID (identification data), and
      when the processing-function-provided packet-type memory LSI obtains the exclusive right of the command bus, the memory controller LSI is designated by using the device ID intrinsic to the memory controller LSI and a command packet is transmitted to the memory controller LSI.

15. A method for controlling a processing-function-provided packet-type memory system comprising:
  a plurality of packet-type memory LSIs (Large Scale Integration circuits);
  a plurality of processing-function-provided packet-type memory LSIs; and
  a memory controller LSI; in which
    the memory controller LSI, the packet-type memory LSIs, and the processing-function-provided packet-type memory LSIs are connected to one another by a bi-directional data bus and a bi-directional command bus and moreover, the memory controller LSI and the processing-function-provided packet-type memory LSIs are connected to each other by a unidirectional ready signal line extending toward the memory controller LSI and a bus adjustment signal line serving as a bi-directional signal line, comprising the steps of:
      transferring the exclusive right of the command bus by requesting to either the memory controller LSI or the processing-function-provided packet-type memory LSIs respectively having the exclusive right of the command bus at present between the memory controller LSI and the processing-function-provided packet-type memory controller LSIs through the bus adjustment signal line, wherein
        the ready signal line, the bus adjustment signal line, the memory controller interrupt signal line, or the processing-function-provided packet-type memory interrupt signal line is used through time-sharing to make it possible to decide which one of the processing-function-provided packet-type memory LSIs drives the signal line.

* * * * *